United States Patent [19]

Kaun et al.

[11] Patent Number: 4,891,280
[45] Date of Patent: Jan. 2, 1990

[54] CATHODE FOR MOLTEN CARBONATE FUEL CELL

[75] Inventors: Thomas D. Kaun, New Lenox; Franklin C. Mrazek, Hickory Hills, both of Ill.

[73] Assignee: The United States of America as represented by the United States Department of Energy, Washington, D.C.

[21] Appl. No.: 855,548

[22] Filed: Apr. 25, 1986

[51] Int. Cl.$^4$ ............... H07M 4/86; H07M 8/14
[52] U.S. Cl. ............................ 429/41; 429/16; 429/44
[58] Field of Search ................ 429/41–42, 429/44, 16

[56] References Cited

U.S. PATENT DOCUMENTS

| | | | |
|---|---|---|---|
| 3,330,699 | 7/1967 | Tantram | 429/16 |
| 3,932,197 | 1/1976 | Katz et al. | 429/44 |
| 3,979,227 | 9/1976 | Katz et al. | 429/42 X |
| 4,251,344 | 2/1981 | Needes | 429/44 X |
| 4,279,971 | 7/1981 | Arendt | 429/46 |
| 4,308,299 | 12/1981 | Arendt | 429/16 X |
| 4,317,865 | 3/1982 | Trocciola et al. | 429/41 |
| 4,423,122 | 12/1983 | Iacovangelo | 429/45 |
| 4,436,794 | 3/1984 | Takeuchi et al. | 429/40 |
| 4,460,495 | 7/1984 | Iacovangelo | 429/16 X |
| 4,564,567 | 1/1986 | Kucera et al. | 429/41 |

FOREIGN PATENT DOCUMENTS 111052  6/1984  European Pat. Off. ............. 429/44

Primary Examiner—Stephen J. Kalafot
Attorney, Agent, or Firm—Hugh G. Glenn; Robert J. Fisher; William R. Moser

[57] ABSTRACT

A porous sintered cathode for a molten carbonate fuel cell and method of making same, the cathode including a skeletal structure of a first electronically conductive material slightly soluble in the electrolyte present in the molten carbonate fuel cell covered by fine particles of a second material of possibly lesser electronic conductivity insoluble in the electrolyte present in the molten carbonate fuel cell, the cathode having a porosity in the range of from about 60% to about 70% at steady-state cell operating conditions consisting of both macro-pores and micro-pores.

13 Claims, 1 Drawing Sheet

CATHODE FOR MOLTEN CARBONATE FUEL CELL

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

This invention relates to cathode materials for a fuel cell and more particularly to a cathode in a molten carbonate fuel cell. A molten carbonate fuel cell is constituted of an anode, a cathode and an electrolyte placed between the electrodes. It is a highly efficient electricity-generating apparatus wherein a fuel and an oxidant are fed into a fuel chamber placed in the anode side and an oxidant chamber placed in the cathode side, respectively, and thereby the energy of chemical reaction at both electrodes is directly converted into electric energy. The electrochemical reaction in the fuel cell progresses at the interfaces of the electrode, the electrolyte and reactant gases, and in the case of high temperature (500°-800° C.) type of molten carbonate fuel cell utilizing an alkali metal carbonate as electrolyte, the electrochemical reaction progresses according to the following equations and the ionic conduction is effected by carbonate ion ($CO_3^{2-}$):

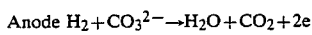

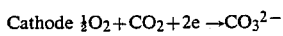

Typically, alkali metal-carbonate electrolyte is used as a matrix type electrolyte impregnated into a sintered porous ceramic or as a paste type electrolyte mix formed into a finely powdered refractory material which may be carried by a tape or the like, the electrolyte becoming molten at cell operating temperatures.

As is known, where the molten electrolyte contacts the anode, hydrogen leaves the fuel chamber and diffuses into the pores of the anode and reacts as indicated above to yield water, carbon dioxide gas and electrons. At the cathode, oxygen and carbon dioxide leaving the oxygen chamber diffuse into the pores of the cathode electrode to form with the electrolyte and the electrode similarly as described above such that the above mentioned reaction progresses to yield carbonate ion. Carbonate ion moves from the cathode to the anode to effect ionic conduction while the electrons leave the anode and reach the cathode by an external circuit.

It is known that pore volume and pore size distribution of the cathode affects the operation of the cell since porosity of the cathode is required for the electrochemical reactions to proceed. Often times, cathode porosity diminishes with cell operation, thereby reducing the efficiency of the cell and the voltage.

It is also known as set forth in U.S. Pat. No. 4,260,495 issued to Iacovangelo July 17, 1984 that the cathode should have a pore volume and pore size distribution which will allow enough electrolyte to enter the cathode to accomplish the reaction but not so much as to "flood" the cathode to the point where the reacting gas cannot diffuse rapidly to its reaction sites. Small pores in the cathode retain the molten electrolyte while the large pores serve to transport gas. In order for the cathode to perform well, it must take up enough electrolyte to allow the cell reaction, yet it must not take up so much electrolyte that the gas cannot diffuse rapidly to and from the reaction sites. The cathode should have some percentage of pores which are small, some percentage of pores which are large and most preferably pore distribution should not change nor should the total porosity of the cathode diminish during cell operation.

SUMMARY OF THE INVENTION

Accordingly, it is an object of the invention to provide a cathode for a molten carbonate fuel cell and method of preparing same wherein the cathode has a total porosity of about 60-70 volume percent which is maintained substantially constant during prolonged cell operation.

Another object of the invention is to provide a cathode for a molten carbonate fuel cell in which macro pores in the order of 25-50 microns are provided in the cathode structure along with micro pores in the order of about 0.1 micron, the micro and the macro pores combining to provide the required cathode porosity.

Yet another object of the invention is to provide a method of forming a cathode for a molten carbonate fuel cell in which the cathode is formed in situ.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

The single drawing FIGURE is a reproduction of an scanning electron microscope secondary electron image photograph showing the preferred cathode composite structure.

DETAILED DESCRIPTION OF THE INVENTION

Figure 1:
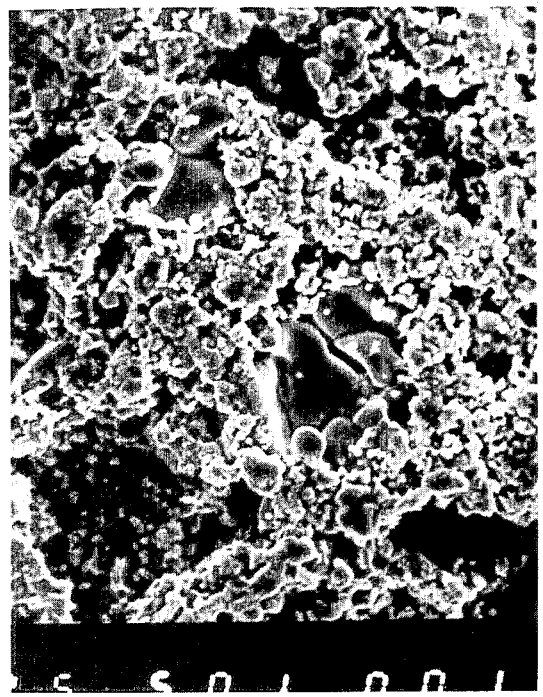

The cathode of the present invention is a combination of two materials, one being an electrically conductive material and the other being a stable material with the conductive material being slightly soluble in the molten carbonate electrolyte and the second material or stable material being substantially insoluble in the molten carbonate electrolyte. By slightly soluble it is meant that the solubility at cell operating temperatures in the range of from about 500° C. to about 850° C. is in the range of from about 25-500 parts per million and by substantially insoluble at cell operating temperatures it is meant that the solubility is less than about 15 parts per million of the material in the molten carbonate electrolyte.

It should be understood that the stable material may have limited conductivity, but it cannot be an electrical insulator. For suitable materials see U.S. Pat. No. 4,564,567 issued Jan. 14, 1986 to Kucera et al., assigned to the assignee hereof, the disclosure of which is incorporated by reference. The cathode structure optionally is formed in situ by admixing substantially equal weights of the electrically conductive material and the stable material and sintering the combination in the presence of molten carbonate at cell operating temperatures to provide a cathode having a porosity in the range of from about 60-70 percent which remains substantially constant during cell operation. The cathode is comprised of macro pores having an average diameter in the range of between about 25 and about 50 microns providing good gas diffusivity and micro pores having an average diameter of about less than 0.1 micron to hold the molten electrolyte in the cathode as required for molten carbonate fuel cell cathode reaction sites.

FIG. 1 is a scanning microscope secondary electron photograph of a cathode showing a lithium manganite and zinc oxide structure with the zinc oxide sintered to form a spongy material covered by the lithium manganite. The materials of FIG. 1 were sintered at temperatures of about 950° C. from a sample consisting of 50% by weight $LiKCO_3$ and 50% being a mixture of 50—50 by weight ratio of lithium manganite and zinc oxide in power form wherein the powders of each material initially were about 1 micron in diameter. After maintaining a sample of the material illustrated in FIG. 1 for about 100 hours at 950° C., no interdiffusion of zinc and manganese was detected by the Energy Dispersive Spectroscopy unit of the scanning electron microscope, thereby illustrating that the skeletal structure of sintered zinc oxide coated by lithium manganite is thermodynamically stable. It should be understood that the cathode has to be formed in the presence of a carbonate salt whether in situ or not.

Alternative materials for the conductive and slightly soluble zinc oxide are nickel oxide, cobalt oxide and copper oxide. Alternative material for the stable generally insoluble material is lithium ferrate. Generally, it has been found that a one-to-one weight ratio seems to be ideal for the molten carbonate fuel cell and although particle sizes for the initial powders are preferred to be about 1 micron, it is possible for the average diameters of the lithium manganite to be up to about 10 microns; however, if the lithium manganite particles are larger than about 10 microns, then micropores are expected and the molten carbonate will not be retained within the cathode structure as required for desired operation of the molten carbonate fuel cell.

Summarizing, a generally one-to-one mixture of conductive powder and stable powder wherein the electrically conductive powder is selected from a group consisting of zinc oxide, nickel oxide, cobalt oxide and copper oxide and the stable material is selected from a group of materials including lithium manganite and lithium ferrate are formed into a desired cathode structure, which is generally planar in shape and maintained in a pressed condition by the use of well known polymeric binders. The plaque of the powders may be positioned in a molten carbonate fuel cell and sintered at cell operating temperatures in the range of from about 500° C. to about 850° C., preferably at about 650° C. to about 750° C. to form a skeletal structure of the type illustrated in FIG. 1. Alternatively the cathode may be preformed, as previously illustrated at temperatures of about 950° C. in the presence of a carbonate salt. The material thus formed does not deteriorate due to the further exposure to cell operating temperatures apparently because the relatively fine lithium manganite particles coat the zinc oxide sponge-like structure thereby preserving the porosity of the formed cathode structure. The cathode of this invention is an improvement over previously known cathode structures because the porosity of the cathode structure does not diminish during cell operating conditions and remains in the 60-70 volume percent range during cell operation which constitutes a substantial improvement over known cathodes.

Also, it is constituted of materials, which in this physical structure provide superior electronic conductivity and material stability to enhance performance and life of molten carbonate fuel cells.

While there has been described what at present is considered to be the preferred embodiment of the present invention, it will be understood that various modification and alternations may be made therein without departing from the true scope and spirit of the present invention which is intended to be covered in the claims appended hereto.

The embodiments of the invention in which an exclusive property or privilege is claimed are defined as follows:

1. A porous sintered cathode useful for a molten carbonate fuel cell comprising a sintered mixture and electrolyte, said sintered mixture being of a first particulate material slightly soluble in the electrolyte present in the molten carbonate fuel and a second particulate material insoluble in the electrolyte present in the molten carbonate fuel cell, said first material forming a skeletal structure coated by particles of said second material, said first and second particulate materials initially having average diameters not greater than about 10 microns, said sintered mixture having a porosity in the range of from about 60% to about 70% by volume at steady-state cell operating conditions and including macro-pores in the range of from about 25 to about 50 microns and micro-pores of about 0.1 microns.

2. The porous sintered cathode of claim 1, wherein the weight ratio of first particulate material to the second particulate material is about 1 to 1.

3. The porous sintered cathode of claim 1, wherein the first particulate material has a solubility in the electrolyte at cell operating temperatures of from about 25 to about 500 p.p.m. by weight.

4. The porous sintered cathode of claim 1, wherein the second particulate material has a solubility in the electrolyte cell operating temperatures of less than about 15 p.o.m. by weight.

5. The porous sintered cathode of claim 1, wherein the first particulate material is selected from the class consisting of the electrically conductive oxides of Zn, Ni, Co and Cu.

6. The porous sintered cathode of claim 1, wherein the second particulate material is selected from the class consisting of $Li_2MnO_3$ and $LiFeO_2$.

7. The porous sintered cathode of claim 1, wherein the first particulate material is ZnO, the second particulate material is $Li_2MnO_3$, the amount of each material in the mixture being about equal and the particle size of both materials being about 1 micron, and the electrolyte is $LiKCO_3$.

8. A porous sintered cathode for a molten carbonate fuel cell, comprising a skeletal structure of a first material slightly soluble in the electrolyte present in the molten carbonate fuel cell covered by fine particles of a second material insoluble in the electrolyte present in the molten carbonate fuel cell, said cathode having a porosity in the range of from about 60% to about 70% at steady-state cell operating conditions, said porosity being comprised of macro-pores in the range of from about 25 to about 50 microns and micro-pores of about 0.1 microns, and electrolyte.

9. The porous sintered cathode of claim 8, wherein said first material has a solubility in the electrolyte at cell operating temperatures of from about 25 to about 500 p.p.m. by weight.

10. The porous sintered cathode of claim 8, wherein said second material has a solubility in the electrolyte at cell operating conditions of less than about 15 p.p.m. by weight.

11. The porous sintered cathode of claim 1, wherein the first material is selected from the class consisting of the oxides of Zn, Ni, Co and Cu.

12. The porous sintered cathode of claim 1, wherein the second material is selected from the class consisting of $Li_2MnO_3$ and $LiFeO_2$.

13. The porous sintered cathode of claim 1, wherein the first material is ZnO and the second material is $Li_2MnO_3$ and the weight of each material in the cathode is about equal.

* * * * *